(12) United States Patent
Lunden et al.

(10) Patent No.: US 9,414,411 B2
(45) Date of Patent: Aug. 9, 2016

(54) METHOD AND APPARATUS FOR MANAGING A WIRELESS CONNECTION

(71) Applicant: Nokia Corporation, Espoo (FI)

(72) Inventors: Jari Lunden, Espoo (FI); Elena Virtej, Espoo (FI); Esa Malkamäki, Espoo (FI); Juha Korhonen, Espoo (FI)

(73) Assignee: Nokia Corporation, Espoo (FI)

( * ) Notice: Subject to any disclaimer, the term of this patent is extended or adjusted under 35 U.S.C. 154(b) by 69 days.

(21) Appl. No.: 14/385,774

(22) PCT Filed: Jan. 3, 2013

(86) PCT No.: PCT/FI2013/050002
§ 371 (c)(1),
(2) Date: Sep. 17, 2014

(87) PCT Pub. No.: WO2013/140024
PCT Pub. Date: Sep. 26, 2013

(65) Prior Publication Data
US 2015/0085768 A1 Mar. 26, 2015

(30) Foreign Application Priority Data
Mar. 19, 2012 (WO) .................. PCT/FI2012/050262

(51) Int. Cl.
*H04W 74/08* (2009.01)
*H04W 56/00* (2009.01)
*H04W 72/04* (2009.01)
*H04W 72/12* (2009.01)

(52) U.S. Cl.
CPC ...... *H04W 74/0833* (2013.01); *H04W 56/0045* (2013.01); *H04W 72/0413* (2013.01); *H04W 72/1278* (2013.01)

(58) Field of Classification Search
None
See application file for complete search history.

(56) References Cited

U.S. PATENT DOCUMENTS

| 2011/0159884 | A1* | 6/2011 | Chawla | H04W 52/0254 455/456.1 |
| 2011/0200032 | A1* | 8/2011 | Lindstrom | H04W 56/0045 370/350 |
| 2011/0223932 | A1* | 9/2011 | Hole | H04W 56/0005 455/456.1 |
| 2012/0014371 | A1* | 1/2012 | Weng | H04J 3/0682 370/350 |

FOREIGN PATENT DOCUMENTS

| EP | 2161960 A2 | 3/2010 |
| EP | 2365717 A1 | 9/2011 |
| EP | 2367386 A1 | 9/2011 |
| WO | WO2009038381 A2 | 3/2009 |
| WO | WO2011087416 A2 | 7/2011 |

* cited by examiner

*Primary Examiner* — Mohammad Adhami
(74) *Attorney, Agent, or Firm* — Seppo Laine Oy

(57) ABSTRACT

In accordance with an example embodiment of the present invention, there is provided an apparatus, comprising at least one processing core configured to receive a first message, the at least one processing core further configured to render the apparatus operable to monitor for at least one of a timing drift and a potential cause of a timing drift; and the at least one processing core further configured to, responsive to determining at least one of a timing drift and a potential cause of a timing drift, cause the apparatus to become operable to cause a transmitter comprised in the apparatus to transmit a second message.

14 Claims, 6 Drawing Sheets

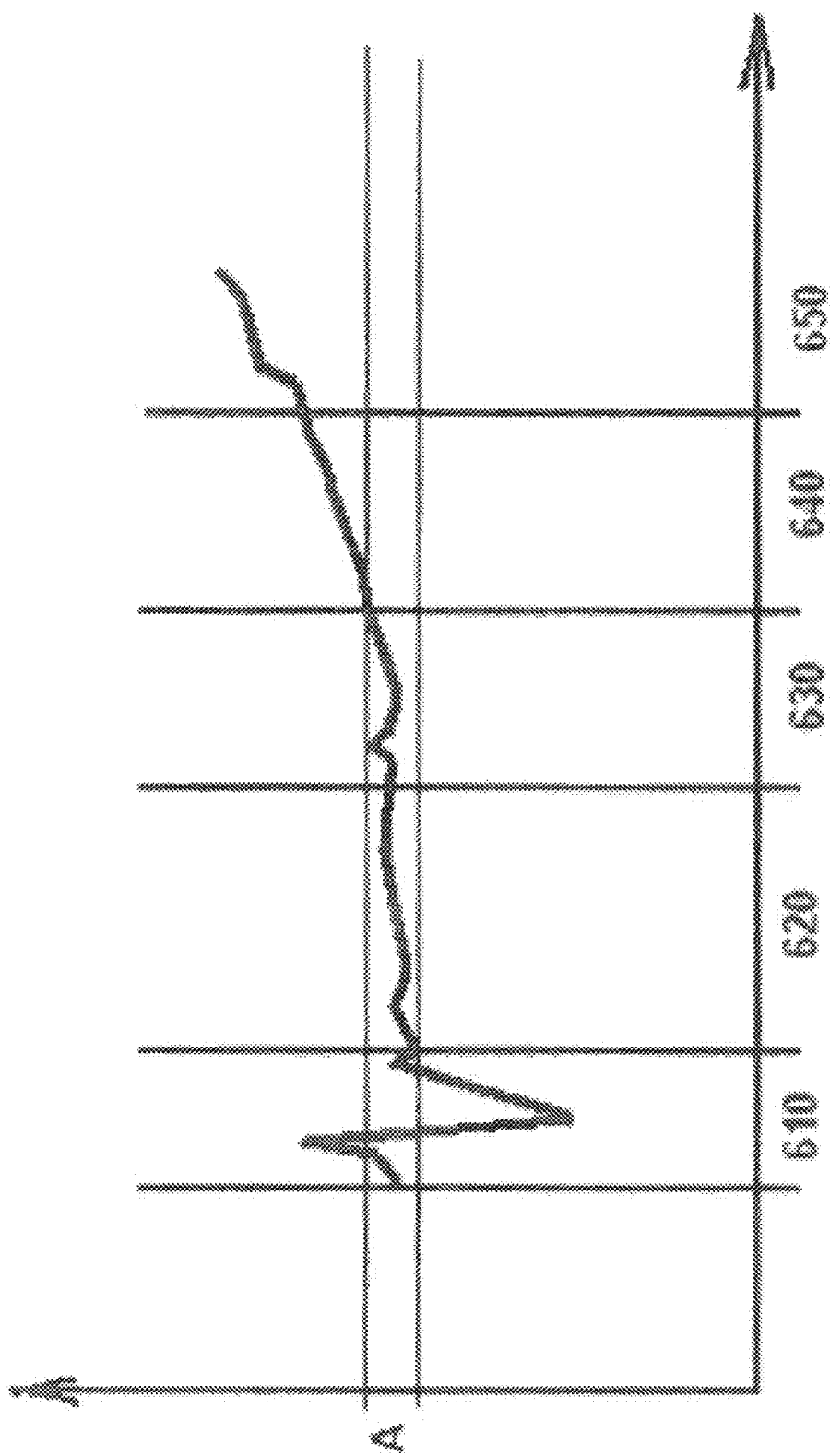

METHOD AND APPARATUS FOR MANAGING A WIRELESS CONNECTION

TECHNICAL FIELD

The present application relates generally to mobile wireless communication and energy management therein.

BACKGROUND

Wireless communication may require the use of radio connections, and in case one of the communication endpoints is mobile, such as a mobile telephone, wireless communication is conducted using battery power. As mobile wireless communication devices, such as cellphones, laptop computers, tablet computers, personal digital assistants and the like, become more complex they tend to draw on more battery power. For example, a large colour display consumes more power than a smaller monochrome display. Likewise a faster data connection, or a data connection that is continuously open, consumes more power than a slower connection, or one that is only intermittently open.

Continuously connected services, for example email, chat, notification and presence services, may preferably have access to a connection that is always open. An open connection in this context refers to a connection that needn't be separately established using a connection or bearer establishment procedure, for each data unit sent over the connection. Thus an application running on a tablet computer, for example, may request a connection that remains open for several hours at a time.

Maintaining a connection in an open state in wireless communication may require that data is exchanged between the wireless communication endpoints, for example at periodic intervals, to ensure that both endpoints are still participating in the connection and that receivers are able to follow changes in a radio channel between the communication endpoints. For example, in cellular communications the base station and mobile terminal may need to maintain power control and channel estimation in order to keep a radio bearer interconnecting them in an active mode. Information exchanged to maintain a connection in an open state may be referred to as control information.

Transmitting control information to maintain a connection in an open state involves drawbacks. For example, transmitting control information from a mobile terminal consumes battery power, and transmitting control information from a base station consumes energy. A base station may have access to a stable power supply, but energy may still be subject to charge. Exchanging control information over an air interface between a mobile terminal and a base station consumes air interface resources. The exchange of control information also raises the interference level in the cell, causing all mobile terminals attached to the cell to increase their transmit power. This in turn increases battery drain in said all mobile terminals.

SUMMARY

Various aspects of examples of the invention are set out in the claims.

According to a first aspect of the present invention, there is provided an apparatus, comprising at least one processing core configured to receive a first message, the at least one processing core further configured to render the apparatus operable to monitor for at least one of a timing drift and a potential cause of a timing drift; and the at least one processing core further configured to, responsive to determining at least one of a timing drift and a potential cause of a timing drift, cause the apparatus to become operable to cause a transmitter comprised in the apparatus to transmit a second message.

According to a second aspect of the present invention, there is provided an apparatus, comprising at least one processor, at least one memory including computer program code, the at least one memory and the computer program code configured to, with the at least one processor, cause the apparatus to at least monitor a time alignment of a user equipment attached to a cell controlled by the apparatus, and responsive to determining that the time alignment of the user equipment changes less than a predefined threshold level of change, transmit a first message to the user equipment, wherein the first message is configured to cause the user equipment to become operable to begin monitoring for at least one of a timing drift and a potential cause of a timing drift.

According to a third aspect of the present invention, there is provided a method in an apparatus, comprising monitoring a time alignment of a user equipment attached to a cell controlled by the apparatus, and responsive to determining that the time alignment of the user equipment changes less than a predefined threshold level of change, transmitting a first message to the user equipment, wherein the first message is configured to cause the user equipment to become operable to begin monitoring for at least one of a timing drift and a potential cause of a timing drift.

According to a fourth aspect of the present invention, there is provided a method, comprising receiving a first message, rendering an apparatus operable to monitor at least one of a timing drift and a potential cause of a timing drift, and responsive to determining at least one of a timing drift and a potential cause of a timing drift, rendering the apparatus operable to cause a transmitter comprised in the apparatus to transmit a second message.

Further aspects of the present invention comprise, for example, computer programs configured to cause methods according to the third and fourth aspects of the invention to be performed.

BRIEF DESCRIPTION OF THE DRAWINGS

For a more complete understanding of example embodiments of the present invention, reference is now made to the following descriptions taken in connection with the accompanying drawings in which:

FIG. 6 illustrates fluctuation of propagation delay between a mobile station and a base station in a system capable of supporting some example embodiments of the invention.

DETAILED DESCRIPTION OF THE DRAWINGS

An example embodiment of the present invention and its potential advantages are understood by referring to FIGS. 1 through 6 of the drawings.

Figure 1:
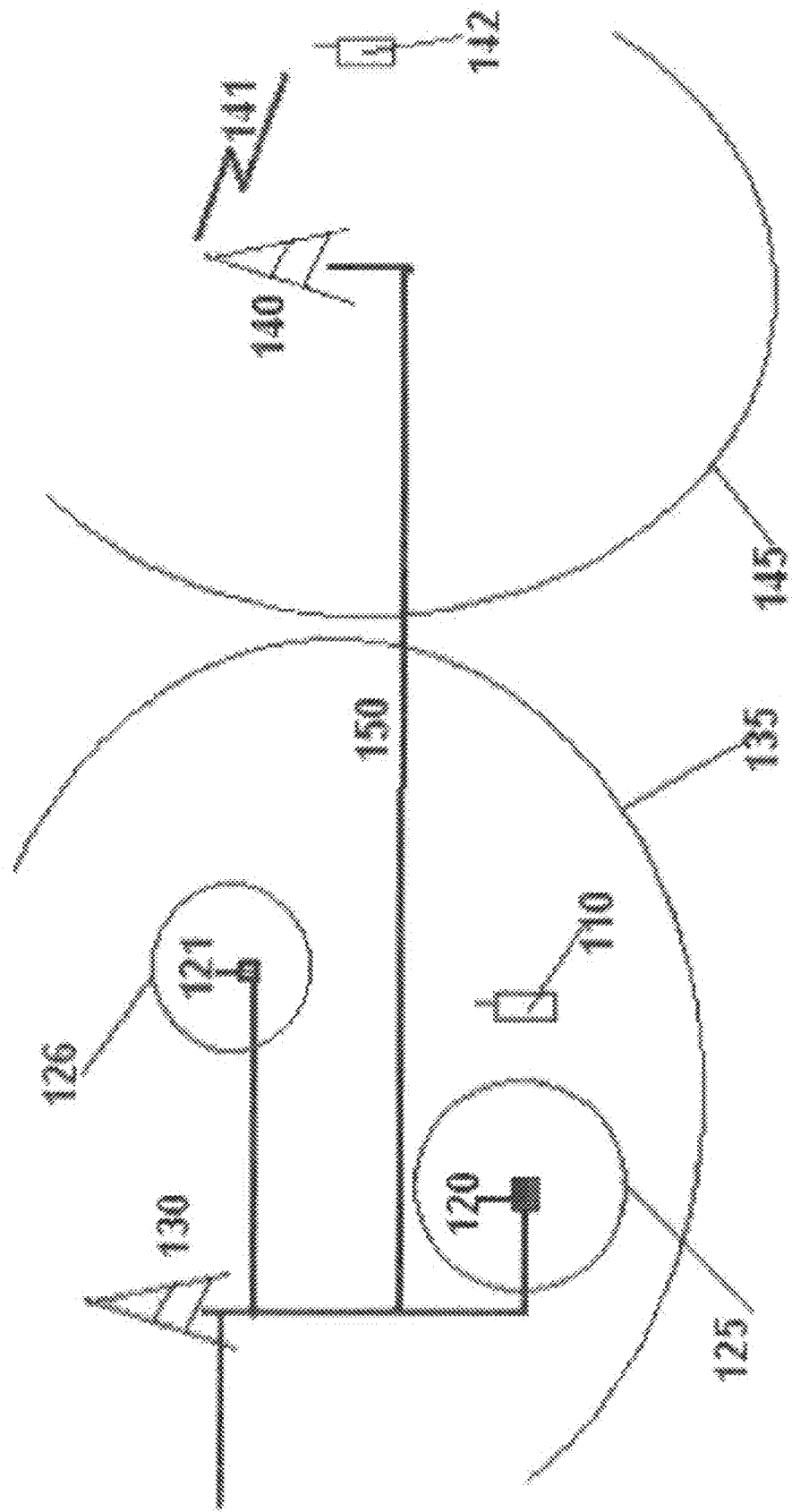
FIG. 1 illustrates an example system capable of supporting at least some embodiments of the invention.

FIG. 1 illustrates an example system capable of supporting at least some embodiments of the invention. The system comprises mobile 110, which may be a cellular telephone, personal digital assistant, PDA, cellular telephone, tablet computer or another kind of device, for example. Base stations 130 and 140 may be configured to operate according to at least one cellular standard, such as global system for mobile communication, GSM, wideband code division multiple access, WCDMA or long term evolution, LTE, for example. Base station 120 may be considered to control a cell of its own. Base stations 130 and 140 may be configured to communicate using a pre-defined band of licensed spectrum, which has been allocated by authorities for cellular communication. Base station 120 may operate according to wireless local area network, WLAN, or worldwide interoperability for microwave access, WiMAX, technologies, for example, or according to a cellular standard like cells 135 and 145, which are controlled by base stations 130 and 140, respectively. Base station 120 may be configured to control a small cell 125. Small cell 125 may be considered to be a smaller cell when compared to cells 135 and 145. Small cell 125 may operate using the same technology as cells 135 and 145, and small cell 125 may be comprised in the same network as cells 135 and 145. Base station 121 may be configured to control a further small cell 126. In the illustrated example, the cell coverage areas of small cell 125 and further small cell 126 are comprised in the cell coverage area of cell 135. Examples of small cells include femtocells and closed subscriber group, CSG, cells. In some embodiments, base stations 120 and 121 are mobile devices.

Mobiles may roam from location to location, and depending on measurements of signal strength between mobile and base station, mobiles may change from communicating with a first base station, such as base station 130, to communicating with another base station, such as base station 140. Such a change may be known as a handover or handoff. In one form of handover, known as soft handover, a mobile may change from communicating with base station 130 only to communicating with base station 130 and base station 140, for example. A set of base stations with which a mobile communicates simultaneously may be known as an active set.

Small cell 125 may be configured to provide additional coverage for a subset of users, such as premium users or emergency services users. Small cell 125 may be configured to provide services that are not available in other cells, such as cells 135 and 145. Small cell 125 may provide a location estimate to users allowed to attach to it since small cell 125 may be a relatively small cell. Calls and connections from small cell 125 may be given preferential access to taxi centres, service numbers and/or intranet/extranet services, for example. In some embodiments small cell 125 is open to all users, and the network in which it and cell 135 are comprised in may be configured to offload certain types of traffic from cell 135 to small cell 125 for users in the cell coverage area of small cell 125. Similar considerations may apply to further small cell 126. A mobile may be capable of determining that a cell is a small cell based on, for example, the radio access technology used, broadcast information from the cell indicating its size or type, indication from the network that a certain cell IDs, or ranges of cell IDs, are small cells, or an indication that a certain carrier has small cells.

Mobile 110 may be capable of communicating with at least one cellular protocol used by base stations 120, 121, 130 and/or 140. FIG. 1 illustrates further mobile 142 in wireless communication with base station 140. Wireless link 141 interconnects further mobile 142 and base station 140. Wireless link 141 may comprise a downlink for conveying information from base station 140 to further mobile 142. Wireless link 141 may comprise an uplink for conveying information from further mobile 142 to base station 140. Both uplink and downlink may convey control information and data. The uplink and/or downlink may each comprise more than one logical channel. The uplink and/or downlink may each comprise more than one physical channel. Wireless link 141 may conform to a cellular communication standard, for example. Wireless link 141 may be based on GSM, WCDMA, LTE or another standard. Wireless link 141 may be based on orthogonal frequency division multiple access, OFDMA, code division multiple access, CDMA, time divisions multiple access, TDMA, or a combination of these, for example. Wireless links between mobiles and base stations 130, 120 and 121 may be substantially similar to wireless link 141. Alternatively a network comprising base stations 120, 121, 130 and 140 may be multi-standard in the sense that base stations comprised therein do not all conform to the same radio access technology, RAT.

Base stations 120, 121, 130 and 140 are in the example system of FIG. 1 interconnected by a backbone network 150. In this example, backbone network 150 is further connected to other parts of the cellular network in which base stations 120, 121, 130 and 140 are comprised. The cellular network, or more generally the network, may comprise in addition to base stations various nodes such as switches, mobility management entities, MMEs, serving gateways, SGWs, base station controllers and the like, depending on the embodiment and type of network.

Where mobile 110, for example, is configured with an application requesting a continuously open connection, the network may be requested to keep open a connection to mobile 110 attached to the network for a period of time. A connection may comprise a bearer. A connection may comprise an uplink control channel, for example a physical uplink control channel, PUCCH. Mobile 110 and/or the network may be configured with a timer defining a length of time a connection is kept open after a data transmission on the uplink and/or downlink. Such a timer may be a release timer, for example, and it may be maintained by the network and/or mobile 110. Responsive to expiry of the release timer, in other words after the length of time defined by the timer has elapsed since a last data transmission on the uplink or downlink, the network or mobile 110 may be configured to initiate release of the open connection. The connection may be caused to be released by explicit signaling, initiated by the network side or mobile 110.

Mobile 110 may be configured with a time alignment timer, TAT. The TAT defines a period of time, during which time alignment is considered to be valid. In some embodiments, time alignment refers to an understanding of a time allowance needed to account for radio propagation delay between a base station and a mobile. Responsive to expiry of a TAT a mobile will be considered to no longer have a valid time alignment. This may mean, for example, that the mobile isn't allowed to transmit in the uplink without invoking a separate random access procedure, for example. TAT may be restarted responsive to a time alignment signaling message. Expiry of TAT may cause at least one of flushing at least one retransmission buffer, initiating release of at least one channel comprised in the connection, for example a PUCCH, and clearing at least one downlink assignment or uplink grant.

Mobile 110 may be configured to set the time alignment timer to infinity, for example, to cause the time alignment to remain permanently valid despite an absence of time alignment signaling messages. This may facilitate providing an application requesting a continuously open connection with the requested connection with low latency and delay. The continuously open connection may require control information to be transmitted periodically to maintain channels comprised in the connection in an active, usable and synchronized state. For example, power control, channel estimation and time synchronization need to be maintained in order for the connection to be usable when needed without additional signaling. Additional signaling may entail at least one of delays and drain on battery resources.

Mobile 110 may be configured to cause control information transmission relating to a continuously open connection to become periodic with a first periodicity when there is no data being transmitted in the uplink and/or downlink. Mobile 110 may be configured to cause control information transmission relating to a continuously open connection to become periodic with a second periodicity when there is data being transmitted in the uplink and/or downlink. The first and second periodicities may be identical or different from each other. Data in this document refers to payload user or signaling data not comprising the control information used to maintain the connection. Payload signaling data may comprise, for example, radio resource control, RRC, signaling messages exchanged between mobile 110 and base station 120, for example. Mobile 110 may be configured to send the control information less frequently when the connection is not used for data transmission, and to send the control information more frequently when the connection is used for data transmission. In other words, mobile 110 may be configured to modify the periodicity of control information transmission in dependence of whether data transmission is present on the uplink and/or downlink. In some embodiments, the lower frequency of control information transmission, corresponding to an absence of data transmission, is selected so as to enable uplink time synchronization maintenance with a base station. By time uplink synchronization it is meant that the length of time it takes for signals originating from mobile 110 to reach a base station is known and mobile 110 may advance the uplink transmission in time by a corresponding offset value.

Mobile 110 may be configured to configure the frequency of control information transmission to zero in absence of data transmission, when mobile 110 can maintain the connection even without periodic control information transmission. In other words, mobile 110 may stop sending the control information altogether when there is no data transmission. In yet further words, mobile 110 may be configured to suppress, even completely suppress, transmitting the control information in absence of data transmission. This may be possible if, for example, mobile 110 is attached to a small cell. In this case mobile 110 knows due to the attachment that uplink time synchronization is maintained, since within the cell coverage area of a small cell mobile 110 cannot move very far, in detail far enough to substantially lose the uplink time synchronization by changing the distance and thus propagation delay between mobile 110 and the base station of the small cell. Another alternative is where mobile 110 determines that it is immobile. In this case mobile 110 may not know it is attached to a small cell but is configured with an uplink timing advance that does not expire, for example by setting the TAT to infinity. When mobile 110 doesn't move, uplink time synchronization is maintained. Mobile 110 may determine it is immobile from measuring Doppler shifts in any received signals, such as broadcast signals from base stations, or from satellite positioning capabilities provided in mobile 110 such as GPS or GALILEO system support, for example. In this sense mobile 110 doesn't need to know its exact location as such, only whether it's moving since regardless of its location, the uplink time synchronization will be maintained as long as mobile 110 is immobile.

Examples of the control information described above include channel quality indicator, CQI, information, sounding reference signal, SRS, information and channel state information, CSI, information, which may comprise CQI, precoding matrix index, PMI, rank indicator, RI, and/or precoding type indicator, PTI, information. CQI information describes to the network a quality of a received downlink signal. SRS information relates to uplink scheduling, and is unnecessary as such in the absence of scheduled data.

In some embodiments, the network is configured to monitor how an uplink time alignment of a mobile 110 develops. Responsive to determining that the time alignment is stable, meaning for example that the time alignment changes less than a predefined threshold level of change. At least in part responsive to the determination that time alignment is stable, the network may be configured to signal to mobile 110 that mobile 110 is to assume responsibility for monitoring changes or potential causes of change in uplink time alignment. As a result, the base station serving mobile 110 may stop transmitting control information to update the time alignment, for example timing advance commands. Signalling may be in form of a medium access control, MAC, or RRC message defined for this purpose or a new field, value or information element that is a part of a message. The threshold level may be defined as changes in the propagation delay of less than a threshold number of microseconds within one minute, for example, or that the propagation delay from mobile 110 to a base station remains within a certain range for more than a predefined time, for example one minute. Responsive to receiving the signal from the network, mobile 110 may be configured to stop sending control information or other transmissions to support monitoring or updating time alignment, and to become operative to monitor for timing drift or potential causes of timing drift. In some embodiments, mobile 110 is configured to continue data transfer normally after receiving the signal from the network. In these embodiments, what is stopped responsive to the signal from the network is transmissions that would otherwise be sent specifically to support monitoring or updating time alignment. By timing drift it is meant a change in the propagation delay between a mobile 110 and a base station 130 the mobile 110 is attached to.

Mobile 110 may continue to consider itself as in an active mode or an uplink synchronized state while monitoring for uplink timing drift. Should mobile 110 determine a need to transmit information in the uplink, for example responsive to an application running in mobile 110 requesting to send data to the network, mobile 110 may resume communications without resorting to a random access procedure in case no timing drift was detected, or the detected timing drift was only sufficiently minor as to not compromise time alignment.

Should mobile 110 determine that timing drift occurs, mobile 110 may be configured to trigger resumption of time alignment updating by signaling to the network. This signaling may comprise, for example, transmitting from mobile 110 a scheduling request to the network, or triggering by mobile 110 a random access procedure with the network. In some embodiments, mobile 110 is configured to use a scheduling request to trigger resumption of time alignment updating responsive to a determined timing drift that is relatively minor, and to trigger a random access procedure responsive to a determined timing drift that is more significant. In some embodiments, for indicating detected or likely timing drift, mobile 110 is configured to use a particular scheduling request resource that is not used when mobile 110 requests resources for UL data arrival. This is feasible, because it can be assumed that timing drift appearance and detection is a relatively slow process taking place on the time scale of a few seconds and then the particular scheduling request resources do not need to be frequent. Mobile 110 could be configured with two nonoverlapping regular sets of scheduling request resources or only one set of regular scheling request resources is configured and some infrequently appearing resources of this set are reserved for triggering resumption of time alignment control. In some embodiments, a MAC control element or RRC signaling is specified to be sent by mobile 110 for indicating need of resumption of time alignment updating. Network would need to grant UL resources every time a mobile 110, who has been configured to monitor changes or potential causes of change in uplink time alignment, sends a scheduling request. If mobile 110 does not detect that there is likely change in uplink timing, it can use a scheduling request when new uplink transmission is needed. In some embodiments, by granting UL resources, the base station may determine timing drift and update time alignment in response to mobile 110 transmitting a scheduling request, which may be followed by a scheduled transmission, without ending responsibility of mobile 110 to monitor for uplink timing drift. In some embodiments, the base station may implicitly resume updating of uplink time alignment after receiving a scheduling request or random access signaling from the mobile 110. In some embodiments, the base station may explicitly signal the mobile 110 that updating of time alignment is resumed by the base station.

In some embodiments, mobile 110 is configured to determine that a timing drift occurs but not do anything immediately responsive to determining it. In other words, mobile 110 may continue to consider itself nominally in an active mode or an uplink synchronized state despite knowledge that time alignment has probably become outdated. The network may similarly consider this mobile 110 to be in an active mode or an uplink synchronized state, since the mobile 110 does not inform the network otherwise. In these embodiments, mobile 110 may take note of a previously determined timing drift when mobile 110 determines a need to transmit information in the uplink, for example responsive to an application running in mobile 110 requesting to send data to the network. In these embodiments, responsive to a need to transmit, mobile 110 may be configured to initiate a random access procedure. In some of these embodiments, mobile 110 may be configured to try using a scheduling request if the previously determined timing drift is relatively minor, by which it may be meant, for example, that uplink timing can still be expected to be within a cyclic prefix.

In some embodiments, mobile 110 is responsible for monitoring and reporting potential uplink timing changes even if mobile 110 had no uplink data to transmit. This may enable downlink data arrival because downlink transmission could then be started without first adjusting TA with a random access procedure that would be initiated with the so called PDCCH order.

An alternative is that mobile 110 might not need to immediately respond to observed timing drift, but is allowed to wait until uplink traffic resumes and then start with random access if the potential TA drift had been significant. Then the network can be less certain about the TA validity, and may choose more often to initiate random access before starting DL data transmission.

Inactivity of mobile 110 may be used as an additional condition to initiate a user supported TA update. The network can detect that mobile 110 is inactive, or has just relatively infrequent background traffic, based on monitoring a traffic pattern or buffer status, for example. For example, mobile 110 could be considered inactive if it has had no data for a certain time, or its activity within certain time window in terms of data rate or number of schedulings has been low. Mobile 110 can detect the activity state in the same way or use additionally information from its operating system or applications.

In general there is provided an apparatus, such as for example mobile 110 or a control device for inclusion in mobile 110 to control functioning of mobile 110. The apparatus may comprise at least one processing core configured to cause time alignment information to be stored in a memory. Where the apparatus corresponds to a control device for inclusion in mobile 110, the control device may comprise at least one processing core configured to control the functioning of the control device and mobile 110. The time alignment information may explicitly or implicitly define a propagation delay. The memory may be comprised either in a control device comprised in mobile 110, or in mobile 110 externally to a control device, or be split between the control device and mobile 110 external to the control device. The time alignment information may be stored responsive to reception of a first message. The first message may comprise the time alignment information. In some embodiments, the apparatus will monitor relative changes in uplink time alignment. When instructed to start monitoring for uplink timing drift or potential causes of change in the time alignment, the apparatus may start monitoring for relative changes from that time onwards.

The at least one processing core may be configured to render the apparatus operable to monitor for at least one of a timing drift and a potential cause of a timing drift. A timing drift may be defined as a change in propagation delay with respect to a propagation delay defined by the stored time alignment information. A potential cause of a timing drift may comprise, for example, that the apparatus has moved. In some embodiments, reception of the first message is a sufficient condition for the at least one processing core to cause the apparatus to begin the monitoring. In some embodiments, at least one further triggering condition must be fulfilled in addition to reception of the first condition before the at least one processing core causes the apparatus to begin the monitoring.

The at least one processing core may be configured to, responsive to determining the presence of a timing drift or potential cause thereof, cause the apparatus to become operable to cause a transmitter comprised in the apparatus to transmit a second message. Where the apparatus corresponds to mobile 110, the transmitter may comprise a radio transmitter or radio transceiver of mobile 110. Where the apparatus corresponds to a control device, for example an integrated chip or chipset for inclusion in mobile 110, the transmitter may comprise an input/output pin, for example, of the control device, configured to provide information defining the second message to a radio transceiver comprised in mobile 110 for transmission on the uplink. The information defining the second message may be conveyed from the control device to a radio transceiver via internal signaling inside mobile 110. In some embodiments, the determination of the presence of timing drift or potential cause thereof is a sufficient condition for the at least one processing core to cause transmission of the second message. In some embodiments, at least one further triggering condition in addition to the determination of the presence of timing drift or potential cause thereof must be fulfilled before the at least one processing core causes the apparatus to transmit the second message.

In some embodiments, the apparatus is configured to receive the first message from a base station node. Where the apparatus is mobile 110, the receiving may occur when a radio receiver comprised in mobile 110 receives a radio signal encoded with the first message. Where the apparatus is a control device for mobile 110, the receiving may occur when information defining the first message is received from the radio receiver at an input/output pin comprised in the control device via internal signaling in mobile 110.

In some embodiments, the second message comprises a request to a network, wherein the second message is configured to request the network to start maintaining uplink time alignment. In some embodiments the second message comprises a scheduling request. In some embodiments, the second message comprises a message configured to trigger a random access procedure with the network. In this case the second message may be known as a random access message. In some embodiments, the second message is a first message comprised in a random access procedure and triggering comprises sending the first message comprised in the random access procedure. A scheduling request and a random access message may be configured to cause the network to start maintaining uplink time alignment.

In some embodiments, the monitoring for a timing drift or potential cause thereof comprises monitoring for at least one of downlink timing drift, changes in relative downlink timing of different cells, handover measurement changes, discovery of a new cell, which may be of a same or different RAT as used to communicate with the base station, data from a sensor comprised in the apparatus and changes in a speed or location of the apparatus. Monitoring a downlink timing drift may comprise using an oscillator mobile 110. Handover measurement changes may comprise changes in reference signal received power, RSRP, averaged over some time period, or pathloss. Monitoring relative downlink timing of different cells may comprise monitoring for changes in time differences between signals received from more than one base station. For example, if the apparatus determines first that signals relating to a same timeslot from a first base station are received slightly before those from a second base station relating to the same timeslot, and then that signals from the second base station are received before those from the first, the relative downlink timing can be considered to have changed, which may correspond to movement of the apparatus and thus indication of timing drift also in the uplink. Discovery of signals from a new cell may indicate movement of the apparatus. Data from a sensor comprised in the apparatus may comprise data from a satellite navigation device comprised in the apparatus that indicates movement. Another example is an acceleration sensor that may produce data allowing the apparatus to deduce it is moving. Monitoring for changes in a speed of the apparatus may comprise monitoring for presence of Doppler shift in received signals, which may also be indicative of movement and thus timing drift. Monitoring for changes in a speed of the apparatus may be based on speed estimation and/or GPS. Changes in handover measurements, which measurements may be filtered, such as signal strength or pathloss from nearby cells, may also indicate movement.

When the apparatus is monitoring the timing drift or cause thereof, it may continue to be uplink synchronized as long as the timing drift is considered to be sufficiently small, for example below a threshold. For handling time alignment timer, TAT, this may mean one or more of the following: TAT is set to infinite value, TAT continues running, but it will not expire, and TAT continues running and may expire, but this does not cause UL resources to be released or flushing of buffer, or a new TAT value may be used and signaled from a base station to the apparatus to indicate that UE is to start monitoring for uplink timing drift.

In some embodiments, the apparatus is configured to monitor for timing drift or cause thereof while remaining in connected mode. An example of connected mode is radio resource control, RRC, connected mode.

In some embodiments, the apparatus is configured to initiate signaling toward the network, using the stored time alignment information, for example when the apparatus determines that is has data to send and no timing drift was determined to exist since reception of the first message.

In some embodiments, the apparatus is configured to suppress transmitting at least some control information during the monitoring. This suppressed control information may be for example channel state information, CSI, which may have been configured to happen periodically or based on events. Suppressing transmission of control information may conserve battery resources of the apparatus. In some embodiments, at least some control information transmission is completely suppresses, in other words not transmitted even intermittently.

In general there is provided a second apparatus, such as for example a base station or access point. The second apparatus is configured, by at least one processor and computer program code, to monitor a time alignment of a user equipment attached to a cell controlled by the apparatus. A hotspot controlled by an access point may be considered a cell. Responsive to determining the time alignment to change less than a predetermined threshold level of change, the apparatus may be configured to transmit a first message to the user equipment, wherein the first message is configured to cause at least in part the user equipment to become operable to begin monitoring for a timing drift.

Figure 4:
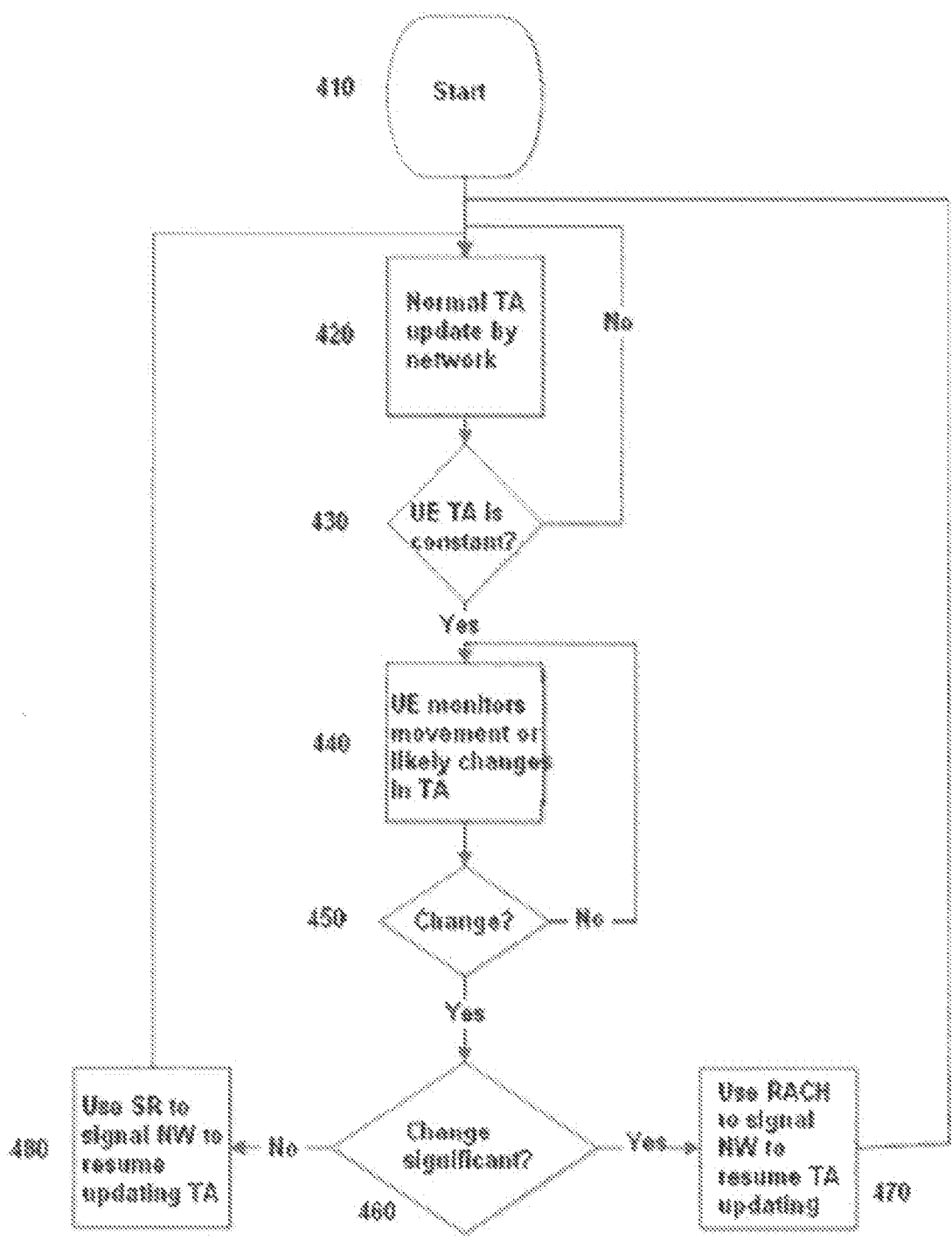
FIG. 4 is a first flowchart of a method according to an example embodiment of the invention.

FIG. 4 is a first flowchart of a method according to an example embodiment of the invention. In the illustrated example, all phases occur during a continuous connected mode. In phase 410 the example procedure is initiated, from which processing proceeds to phase 420. In phase 420, normal time alignment procedures are conducted by the network. Normal time alignment procedures may comprise, for example, user equipment, UE, such as, for example, a mobile 110, performing periodic or otherwise frequent transmissions or at least one of control information or data to the network, and the network determining a timing drift based on these uplink transmissions. Based on the determined drift, the network may be configured to transmit time alignment commands to the UE, which the UE uses to modify the time offset it applies to uplink transmission and to update time alignment information in the UE.

In phase 430, the network may determine, whether time alignment of the UE appears essentially constant. When the time alignment is determined to not be essentially constant, processing returns to phase 420. When time alignment is determined, based on at least one predetermined criterion, to be essentially constant, processing advances to phase 440. In phase 440, the UE may monitor its movement or likely changes in time alignment, TA. In other words, in phase 440 the UE may monitor for timing drift. Timing drift may refer to, for example, change in the propagation delay in the sense of the length of time electromagnetic waves take to propagate from the UE to a base station the UE is attached to. Phase 440 may commence in the UE responsive to a signaling message from the network. As long as the UE detects no timing drift, meaning that any determined timing drift is negligible in the sense that it is of lower magnitude than a threshold, which threshold may be configured in the signaling message received from the network to trigger phase 440, processing remains in phases 440 and 450.

Responsive to detecting a timing drift, processing proceeds from phase 450 to phase 460 where the detected timing drift is classified as significant or not significant. Classification as significant or not significant may depend, for example, on whether a change in propagation delay is more or less than a threshold value. The threshold value may correspond to potential UL timing change such that UL timing can still be expected to be within a cyclic prefix. The threshold value may be configured by the network, for example in a signaling message instructing the UE to transition to phase 440. Responsive to the timing drift being classified as significant, processing proceeds to phase 470. In phase 470 the UE uses a random access procedure to contact the network to trigger a resumption in time alignment updating and processing returns to phase 420. Responsive to the timing drift being classified as not significant, processing proceeds to phase 480. In phase 480, the UE transmits a scheduling request to the network to resume updating the time alignment. In the scheduling request transmission, the UE may use the time alignment determined to be constant in phase 430. In other words, the UE may use the slightly incorrect time alignment since the change was considered in phase 460 to be not significant. However, since the time alignment was assessed to be changing and no longer constant, resuming the updating procedure is prudent. UE may, based on monitoring the UL timing drift or potential causes of that, have an estimate of the direction or magnitude of the drift. This estimated UL timing drift may be used for updating the time alignment determined in phase 430 before using it.

Figure 5:
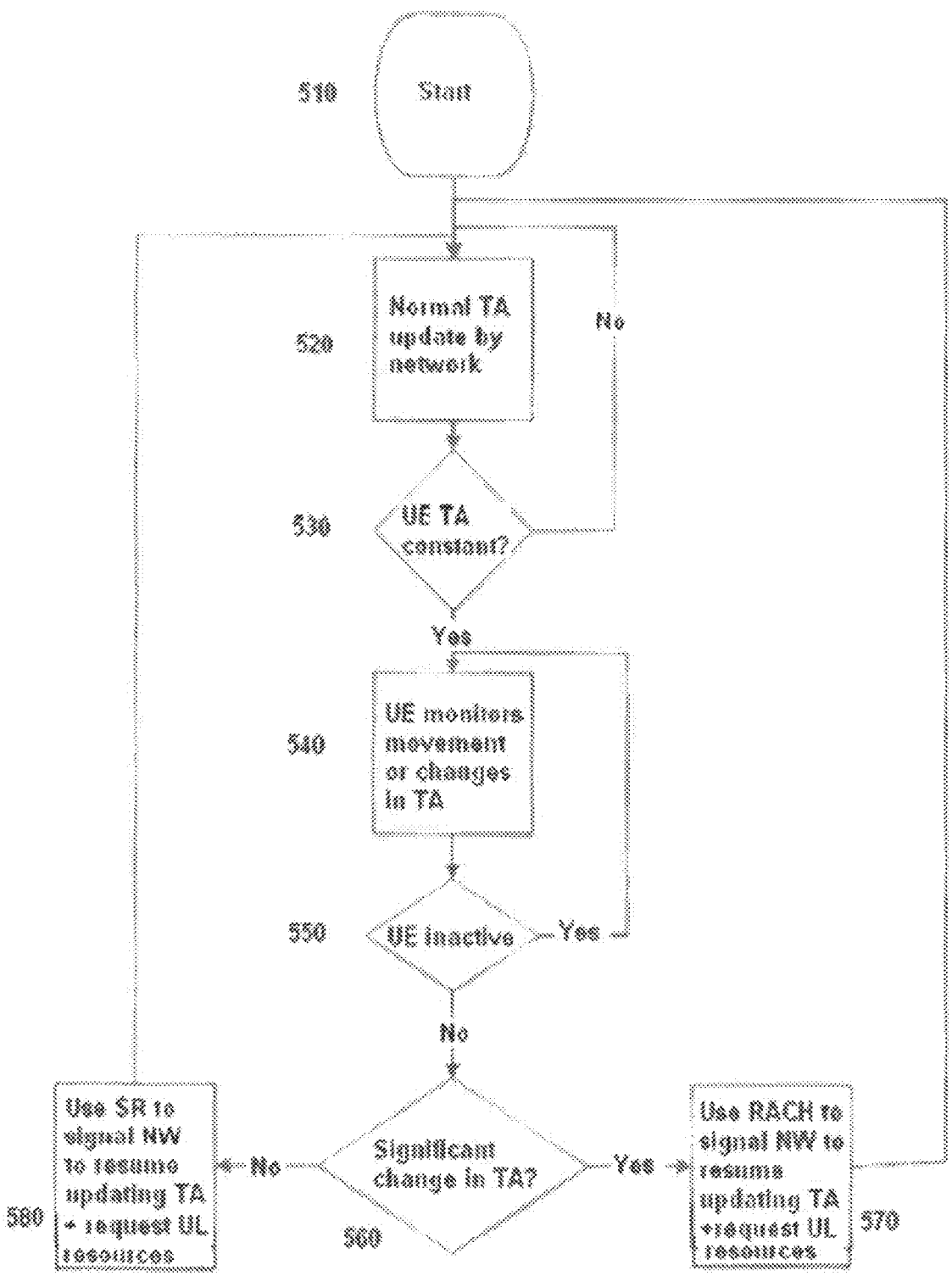
FIG. 5 is a second flowchart of a method according to an example embodiment of the invention.

FIG. 5 is a second flowchart of a method according to an example embodiment of the invention. In FIG. 5, phases 510, 520, 530 and 540 may substantially correspond to phases 410, 420, 430 and 440, respectively, of FIG. 4 which have been described above. An apparatus operating in accordance with the embodiment of FIG. 5 may be configured to perform no specific actions toward the network in response to only detecting a timing drift. In phase 550 it is determined, if the UE is in an inactive state. By inactive state it is meant that the UE has not been involved in data transmission for a certain time, or that its activity within a certain time is below a threshold value. For example, the UE may only have transmitted small amounts of data sporadically, such as data for a text-based chat or sensor update application. The activity status may be controlled by applications running in the UE, or by an operating system of the UE. UE may be also considered active if it has more than a threshold amount of data in the transmission buffer waiting for transmission or if it has delay sensitive data waiting for transmission. In some embodiments, instead of checking whether UE is inactive or not, this checking can simply be whether UE has data to transmit or not, in other words, the UE can be considered inactive if the UE has no data to transmit. Where the UE is in phase 550 determined to be inactive according to the at least one criterion used, processing returns to phase 540. Where the UE is in phase 550 determined to be active according to the at least one criterion used, processing advances to phase 560.

In phase 560, it is determined whether a significant timing drift has occurred. Any detected timing drift may be classified as significant or not significant. Classification as significant or not significant may depend, for example, on whether a change in propagation delay is more or less than a threshold value. The threshold value may be configured by the network, for example in a signaling message instructing the UE to transition to phase 540. Responsive to classifying a detected timing drift as significant, the UE operating in accordance with the embodiment of FIG. 5 may be configured to initiate a random access procedure 570 with the network to cause time alignment updating to resume. The random access procedure may also be operable to request uplink resources from the network.

Where in phase 560 it is determined that either no timing drift has occurred, or only a timing drift that is not classified a significant has occurred, processing advances to phase 580. In phase 580 a scheduling request is transmitted to the network requesting uplink resources, the scheduling request being configured to cause time alignment updating with the network to resume. In the scheduling request transmission, the UE may use the time alignment determined to be constant in phase 530. In other words, the UE may use the slightly incorrect time alignment since the change was considered in phase 560 to be not significant. The UE may also correct the time alignment determined in phase 530 based on estimated timing drift before transmitting the scheduling request.

FIG. 6 illustrates fluctuation of propagation delay between a mobile station and a base station in a system capable of supporting some example embodiments of the invention. FIG. 6 illustrates a coordinate system where time advances along the horizontal axis from left to right, and propagation delay between a mobile 110 and a base station increases from bottom toward the top on the vertical axis.

In phase 610, the propagation delay, and thus time alignment, fluctuates which may correspond to a mobile 110 that moves around within a cell coverage area of a cell controlled by the base station. In phase 620 the propagation delay is relatively stable, and the base station may be configured to detect the stability of the propagation delay. For example, the base station may determine that during a time period of predefined length, the propagation delay does not vary by more than a certain percentage, such as for example 5%. In some embodiments, the base station is configured to consider the propagation delay as stable responsive to determining that during a time period of predefined length the propagation delay varies so little that there is no need for updating the time alignment, in other words no timing advance commands are transmitted to mobile 110. In the illustrated example, the base station may be configured to transmit to mobile 110 a first message, the first message being configured to cause mobile 110 to become operable to begin monitoring for timing drift. The first message may be transmitted to mobile 110 at the point in time that corresponds to the transition point between phases 620 and 630.

In phase 630 mobile 110 may be configured to store a time alignment current in phase 620. In phase 630 mobile 110 may be configured to monitor for a timing drift, for example responsive to having received the first message and possibly other triggering criteria. A change in the propagation delay that constitutes a timing drift may be defined, for example in the first message. In FIG. 6, the band A illustrates the range of propagation delays which are considered to not involve a timing drift relative to the situation in phase 620. Band A may be explicitly or implicitly defined in the first message. At the end of phase 630 mobile 110 determines that the propagation delay changes sufficiently so as to move outside band A. In the embodiment of FIG. 4, mobile 110 is configured to transmit a second message to the base station at least in part responsive to the determination. The second message may comprise, for example, a scheduling request or random access message depending on the magnitude of the timing drift. The base station may in response to the scheduling request from mobile 110 send a timing advance command to mobile 110 to update the time alignment. Alternatively, the base station may schedule additional transmission of for example sounding reference signals, channel state information report or other control information from the mobile 110 in order to better estimate the timing drift. After network updates the time alignment of mobile 110, for example using a timing advance command, mobile 110 may in some embodiments continue monitoring timing drift, for example if the timing drift is minor. In some embodiments the base station may resume updating the time alignment only after explicit signaling to mobile 110 indicating this. In other variants of the embodiment of FIG. 4, mobile 110 always transmits a random access message responsive to detecting a timing drift, regardless of the magnitude of the timing drift.

In the embodiment of FIG. 6, mobile 110 may do nothing as such responsive to the propagation delay leaving band A. In this case, in phases 630 and 640, mobile 110 may keep track of the increasing change in propagation delay, that is the timing drift, and wait for a change in the activity level of mobile 110. Responsive to determining that applications or the operating system, OS, of mobile 110 request active data transfer, mobile 110 in the embodiment of FIG. 5 may be configured to transmit a scheduling request or random access message, for example a random access preamble, to the network, as described above in connection with FIG. 5. As described above, mobile 110 may decide based on the magnitude of the timing drift whether to use a scheduling request or a random access message configured to trigger a random access procedure with the network.

In phase 650, time alignment updating resumes in response to the second message, allowing mobile 110 to communicate reliably with the base station despite changes in the propagation delay.

In some embodiments, mobile 110 may consider the uplink time alignment still valid if the timing drift exceeds the threshold at some point of time, but later the timing drift falls back within the threshold. For example, the relative downlink timing of different cells differs initially from the values stored at the moment mobile 110 starts monitoring for timing drift, but later return close to the stored values. In some embodiments the timing drift is not considered to have occurred before it has persisted for at least a predefined time.

In an embodiment, the network controls monitoring of timing drift in mobile 110 by using RRC configuration. Mobile 110 starts monitoring TA changes when it receives an RRC reconfiguration message activating the monitoring. Mobile 110 then monitors timing drifts and reports them to the network as described above. However, Mobile 110 does not in this embodiment stop monitoring the timing drift when it indicates to the network that timing has changed. Mobile 110 stops the timing drift monitoring only when it receives a new RRC reconfiguration message deactivating the monitoring. Instead of RRC signaling, also MAC level signaling could be used, for example MAC control elements, CE. Thus Mobile 110 would move from 470 or 480 to 440 in FIG. 4, or from 570 or 580 to 540 in FIG. 5.

Figure 2:
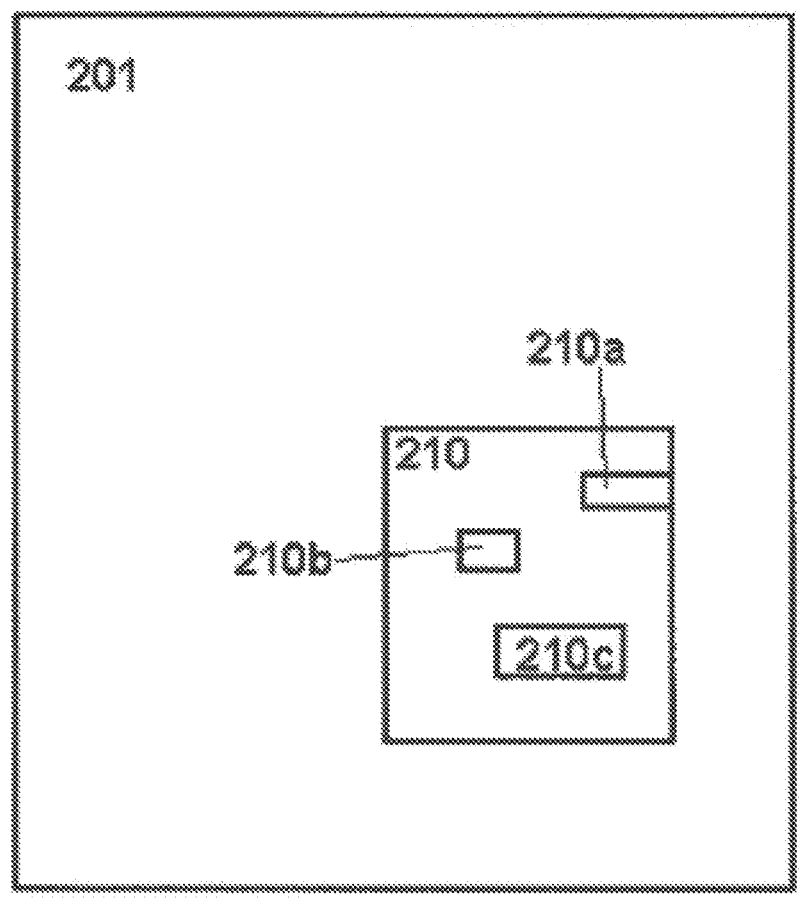
FIG. 2 illustrates an example apparatus capable of supporting at least some embodiments of the present invention.

FIG. 2 illustrates an example apparatus 201 capable of supporting at least some embodiments of the present invention. The apparatus may correspond to mobile 110, or base station 120, for example. The apparatus is a physically tangible object, for example a mobile telephone, personal digital assistant, data dongle or a similar device. The apparatus may comprise a control apparatus 210, for example a microprocessor, digital signal processing, DSP, processor, field-programmable gate array, FPGA, application-specific integrated circuit, ASIC, chipset or controller. The apparatus may further comprise a transmitter and/or a receiver 210a configured to enable the apparatus 201 to connect to other apparatuses. A combination of transmitter and receiver may be called a transceiver. The apparatus may comprise memory 210b configured to store information, for example time alignment information. The memory may be solid-state memory, dynamic random access memory, DRAM, magnetic, holographic or other kind of memory. The apparatus may comprise logic circuitry 210c configured to access the memory 210b and control the transmitter and/or a receiver 210a. The logic circuitry 210c may be implemented as hardware or a combination of software and hardware. The logic circuitry 210c may comprise at least one processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transmitter and/or a receiver 210a. The logic circuitry 210c may be control circuitry. The transmitter and/or a receiver 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210. In embodiments where apparatus 201 is a mobile user equipment, apparatus 201 may comprise at least one antenna.

Figure 3:
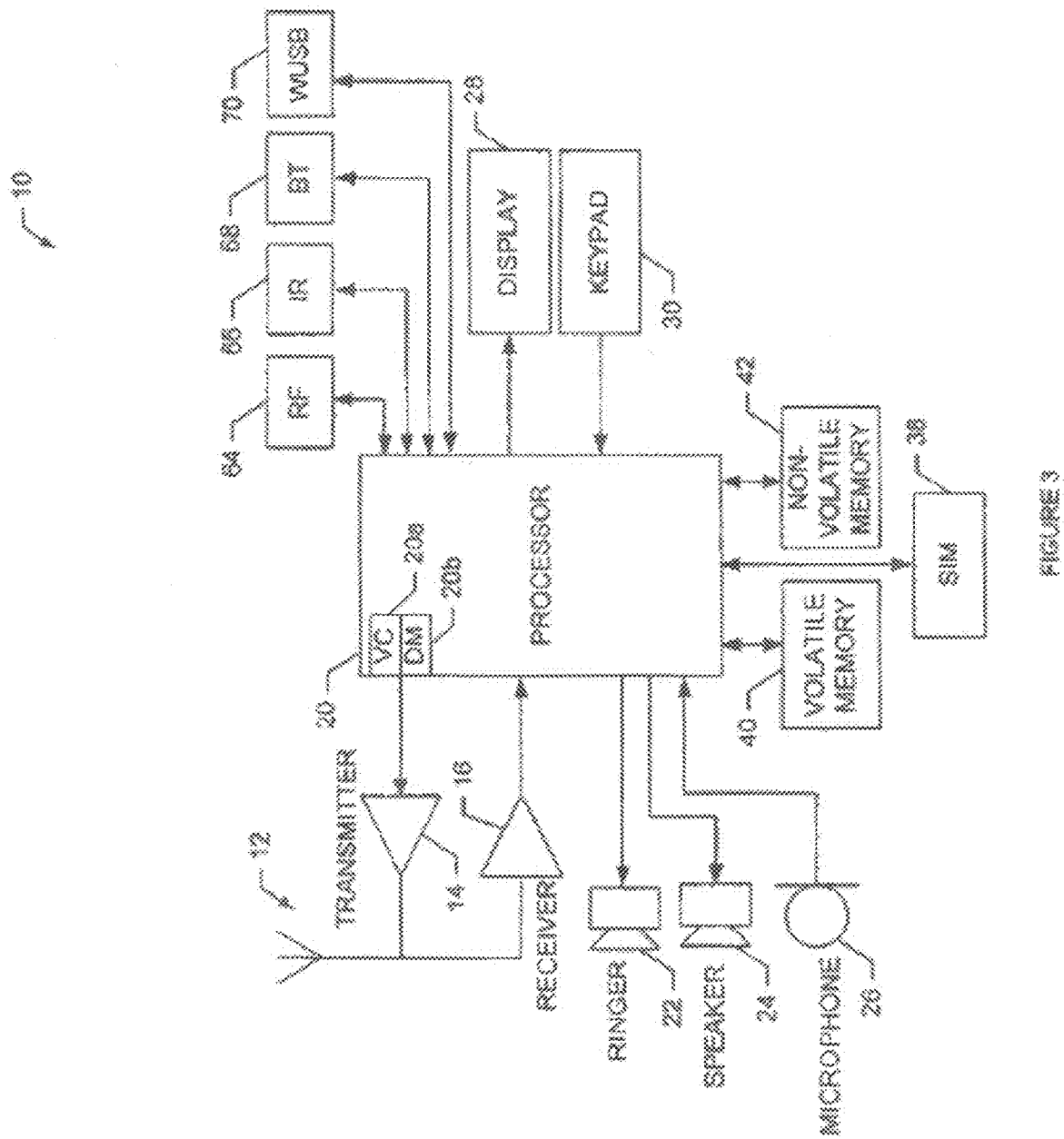
FIG. 3 illustrates a block diagram of an apparatus such as, for example, a mobile terminal, in accordance with an example embodiment of the invention.

FIG. 3 illustrates a block diagram of an apparatus 10 such as, for example, a mobile terminal, in accordance with an example embodiment of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 10 may be configured to control the functioning of the transmitter and receiver by effecting control signaling via electrical leads to the transmitter and receiver. Likewise processor 10 may be configured to control other elements of apparatus 10 by effecting control signaling via electrical leads connecting processor 10 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 3, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™ BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40 non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

Without in any way limiting the scope, interpretation, or application of the claims appearing below, a technical effect of one or more of the example embodiments disclosed herein is conservation of battery power in a mobile communication device. Another technical effect of one or more of the example embodiments disclosed herein is that less interference is caused in a cell as less control information is transmitted. Another technical effect of one or more of the example embodiments disclosed herein is that via the lowered interference, also other mobile devices may save battery resources.

Embodiments of the present invention may be implemented in software, hardware, application logic or a combination of software, hardware and application logic. The software, application logic and/or hardware may reside on memory 210b, the control apparatus 210 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2 or FIG. 3. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   a radio transceiver;
   at least one processing core configured to receive a first message;
   the at least one processing core further configured to render the apparatus operable to monitor, while in a connected mode, for at least one of a timing drift and a potential cause of a timing drift; and
   the at least one processing core further configured to, responsive to determining at least one of a timing drift and a potential cause of a timing drift, cause the radio transceiver to transmit at least one of a scheduling request and a message configured to initiate a random access procedure, wherein the apparatus determines to send either the scheduling request or the message configured to initiate the random access procedure based on a magnitude of a determined timing drift.

2. An apparatus according to claim 1, wherein the apparatus comprises a mobile communication device.

3. An apparatus according to claim 1, wherein a receiver is configured to receive the first message from a base station node.

4. An apparatus according to claim 1, wherein the monitoring for a timing drift comprises monitoring at least one of downlink timing drift, relative downlink timing of different cells, discovery of a new cell, data from a sensor comprised in the apparatus and changes in a speed or location of the apparatus.

5. An apparatus according to claim 1, wherein the apparatus is configured to initiate signaling toward a network, in case the apparatus determines it has data to send and where no timing drift was determined.

6. An apparatus according to claim 1, wherein the apparatus is configured to suppress sending uplink control information during the monitoring.

7. An apparatus according to claim 1, wherein the apparatus is configured to completely suppress sending uplink control information during the monitoring.

8. An apparatus, comprising:
   at least one processor; and
   at least one memory including computer program code
   the at least one memory and the computer program code configured to, with the at least one processor, cause the apparatus to perform at least the following:
      monitor a time alignment of a user equipment attached to a cell controlled by the apparatus;
      responsive to determining that the time alignment of the user equipment changes less than a predefined threshold level of change, transmit a first message to the user equipment, wherein the first message is configured to cause the user equipment to begin monitoring for at least one of a timing drift and a potential cause of a timing drift.

9. A method in an apparatus, comprising:
   monitoring a time alignment of a user equipment attached to a cell controlled by the apparatus;
   responsive to determining that the time alignment of the user equipment changes less than a predefined threshold level of change, transmitting a first message to the user equipment, wherein the first message is configured to cause the user equipment to begin monitoring for at least one of a timing drift and a potential cause of a timing drift.

10. A method, comprising:
    receiving a first message;
    rendering an apparatus operable to monitor, while in a connected mode, at least one of a timing drift and a potential cause of a timing drift; and
    responsive to determining at least one of a timing drift and a potential cause of a timing drift, transmitting at least one of a scheduling request and a message configured to initiate a random access procedure, wherein the apparatus determines to send either the scheduling request or the message configured to initiate the random access procedure based on a magnitude of a determined timing drift.

11. A method according to claim 10, comprising receiving the first message from a base station node.

12. A method according to claim 10, wherein the monitoring for a timing drift comprises monitoring at least one of downlink timing drift, relative downlink timing of different cells, discovery of a new cell, data from a sensor comprised in the apparatus and changes in a speed of the apparatus.

13. A method according to claim 10, comprising initiating signaling toward a network responsive to a determination that there is data to send and where no timing drift was determined.

14. A computer program product comprising a non-transitory computer-readable medium bearing computer program code embodied therein for use with a computer, the computer program code comprising:

code for causing receiving a first message;

code for rendering an apparatus operable to monitor for at least one of a timing drift and a potential cause of a timing drift; and code for responsive to determining a timing drift, transmitting at least one of a scheduling request and a message configured to initiate a random access procedure, wherein the apparatus determines to send either the scheduling request or the message configured to initiate the random access procedure based on a magnitude of a determined timing drift.

\* \* \* \* \*